United States Patent [19]
Hudson et al.

[11] Patent Number: 5,529,621
[45] Date of Patent: Jun. 25, 1996

[54] SURFACTANTS FOR IMPROVING THE GEL PROPERTIES OF CLAY MINERALS IN COATING COMPOSITIONS

[75] Inventors: Alice P. Hudson, Jupiter; James E. Nevin, Boynton Beach, both of Fla.

[73] Assignee: Surface Chemists of Florida Inc., Riviera Beach, Fla.

[21] Appl. No.: 482,483

[22] Filed: Jun. 8, 1995

[51] Int. Cl.$^6$ .................................................. C09D 195/00
[52] U.S. Cl. .................................................. 106/278
[58] Field of Search .................................................. 106/278

[56] References Cited

U.S. PATENT DOCUMENTS

| | | | |
|---|---|---|---|
| 3,738,852 | 6/1973 | Doi et al. | 106/278 |
| 3,928,061 | 12/1975 | Hellsten et al. | 106/273 N |
| 3,997,354 | 12/1976 | Pivette et al. | 106/278 |
| 4,038,102 | 7/1977 | Hellsten et al. | 106/316 |
| 4,338,136 | 7/1983 | Goullet et al. | 106/278 |
| 4,759,799 | 7/1988 | Vicenzi | 106/278 |

*Primary Examiner*—David Brunsman

[57] ABSTRACT

This invention is to surfactant compositions which are organic salts of a polyamine and a carboxylic acid. The polyamine has the structure:

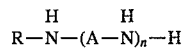

wherein R is (i) alkyl or alkenyl containing from about 10 to about 22 carbon atoms or (i) R'—O—CH2CH2CH2— wherein R' is alkyl containing from about 8 to about 22 carbon atoms;

A is a divalent hydrocarbyl group containing about 2 to about 6 carbon atoms;

and n is an integer from about 1 to about 3.

The carboxylic acid has the structure:

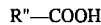

wherein R" is alkyl or alkenyl containing about 6 to about 22 carbon atoms.

The surfactants may contain polar activators.

This invention is also to compositions containing asphalt, a clay mineral, and the above described surfactant.

2 Claims, No Drawings

SURFACTANTS FOR IMPROVING THE GEL PROPERTIES OF CLAY MINERALS IN COATING COMPOSITIONS

FIELD OF THE INVENTION

This invention is related generally to coating compositions which incorporate clays as thickening or gelling agents requiring a surfactant to maximize their effectiveness. These compositions are mixtures of a base adhesive, normally asphalt, the clay thickener, and surfactant. The compositions can also include various fillers and can be used in many applications, including but not limited to roof coatings, paints and automotive undercoatings.

BACKGROUND OF THE INVENTION

Historically asbestos has been used in asphalt roofing compositions to provide a gelled structure, but environmental concerns have constrained the industry to seek alternative gelling and viscosifying agents. Clay minerals and particularly attapulgite clay minerals have been shown to be effective and are widely used. The attapulgite clays however require the use of cationic surfactants to fully develop the gelling and viscosity properties of the clay.

Cationic surfactants which have been used in this application include quaternary ammonium salts such as Arquad 2C-75 and Arquad T-50 from AKZO Chemicals and Adogen 3690 sold by Witco Chemical. The quaternary salts are corrosive to metal surfaces, and also require relatively high application levels to be effective. They are solid materials at ambient temperatures and are usually diluted with ethanol or isopropanol to render them liquid. The resulting mixtures are flammable which is undesirable in the industries in which they are used. They are water soluble, which may contribute water sensitivity to the final composition, and may also allow them to leach from the asphalt composition creating an environmental hazard.

Also used are alkyloxyalkylamine salts such as PA-14 acetate sold by Tomah Products, Milton, Wis. This product is more effective than the quaternary ammonium salts, but still requires high levels in some applications. This salt is also water soluble.

There is a need for a more efficient surfactant to allow more economical coating compositions. There is also a need for water insoluble surfactants for these applications to eliminate any environmental hazard from leaching of the products from the coating compositions.

OBJECTS OF THE INVENTION

The principal object of this invention is to provide effective products to enhance the viscosity properties of clay minerals in roofing asphalt, automotive underbody coatings, paints and other applications.

Another object is to provide materials effective at economical levels in asphalt roof coating compositions.

Another object is to provide compositions which are nonflammable, noncorrosive, and water insoluble.

These and other important objects will be apparent from the descriptions of this invention which follow.

SUMMARY OF THE INVENTION

This invention is directed toward surfactant compositions for use as adjuvants to develop the gelling characteristics of attapulgites and other clays used to thicken, stabilize and impart thixotropic properties to asphalt and other bituminous materials as well as paints and other coatings. The surfactants compositions are organic salts of a polyamine and a carboxylic acid. The polyamine has the structure:

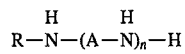

wherein R is chosen from the group consisting of (i) alkyl or alkenyl containing from about 10 to about 22 carbon atoms, and (ii) R'—O—CH2CH2CH2— wherein R' is alkyl containing from about 8 to about 22 carbon atoms;

A is a divalent hydrocarbyl group containing about 2 to about 6 carbon atoms;

and n is an integer from about 1 to about 3.

The carboxylic acid has the structure:

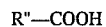

wherein R" is alkyl or alkenyl containing about 6 to about 28 carbon atoms.

The surfactant composition may optionally contain a minor amount of a low molecular weight polar compound herein referred to as a polar activator.

This invention also includes asphalt compositions containing asphalt cutback, a clay mineral, and the organic salt surfactant described above. Filler materials and other adjuvants commonly present in asphalt compositions may also be included.

Another aspect of this invention is the method whereby asphalt compositions are gelled or viscosified by the inclusion of clay minerals and the surfactant compositions of this invention.

DESCRIPTION OF THE PREFERRED EMBODIMENTS

The surfactants of this invention are organic salts of a polyamine and a carboxylic acid. The polyamine has the structure:

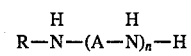

wherein R is chosen from the group consisting of (i) alkyl or alkenyl containing from about 10 to about 22 carbon atoms, and (ii) R'—O—CH2CH2CH2— wherein R' is alkyl containing from about 8 to about 22 carbon atoms;

A is a divalent hydrocarbyl group containing about 2 to about 6 carbon atoms;

and n is an integer from about 1 to about 3.

The carboxylic acid has the structure:

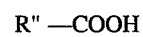

wherein R" is alkyl or alkenyl containing about 6 to about 28 carbon atoms.

The surfactant compositions may optionally contain polar organic or inorganic activators.

Examples of suitable polyamines are the amines formed by the addition of acrylonitrile to an alkyl, alkenyl, or alkyloxypropyl primary amine and subsequent reduction of the nitrile to a primary amine. The resulting compound is a diamine. The reaction can be repeated by adding an additional acrylonitrile moiety to the primary amine from the reduction of the nitrile, and subsequent reduction of the nitrile forming a triamine. Tetramines can be formed in like manner from the triamines. Other suitable amines are N-alkyl-1,2-ethylene diamines and the corresponding triamines and tetramines, which can be synthesized from the reaction of $C_{10}$ to $C_{22}$ alkyl halides and ethylene diamine or polyethylene polyamines. Still other suitable amines can be synthesized by the reaction of $C_{10}$ to $C_{22}$ alkyl halides and diamines such as 1,6 hexamethylene diamine, 1,3 pentane diamine, and 2-methyl-1,5 pentamethylene diamine. Preferred amines are N-alkyl-1,3-propylene diamines with an alkyl chain length of between 10 and 18 carbons and alkyloxy propyl diamines with 10 to 15 carbons in the alkyl group.

Examples of suitable acids include branched and straight chain alkyl or alkenyl carboxylic acids with about 6 to about 28 carbon atoms. Especially suitable are neo acids formed from the reaction of branched olefins and carbon monoxide in the presence of an aqueous acidic catalyst. Preferred acids are neo acids with between about 7 and about 15 carbon atoms, and mixtures of these are more preferred. Neo acids are available both from hatched sources and from coproduct or byproduct streams of the same.

To prepare the organic salts of this invention, the polyamine component and the carboxylic acid component are mixed in a weight ratio such that the amine moieties and the carboxyl moieties are present in about equimolar quantities.

The organic salts of this invention may be mixed with polar activators to enhance the dispersion and wetting properties of the salt surfactant. Such polar activators include the short carbon chain alcohols, preferably isopropyl alcohol, and water or any combination thereof and are present at about 0 to about 50 percent of the formulation. Levels between about 10 and 20 percent are preferred. The most preferred activator is water. The addition of the polar activators improves both the immediate gellation of the asphalt composition as well as the long term stability of the gel. The presence of the polar activators often improves the efficiency of the surfactant and allows a decrease in the level of surfactant used.

This invention is also directed toward compositions of asphalt and other bituminous materials in which the above described surfactants are used with clay minerals to thicken, stabilize and impart thixotropic properties to the composition. Such compositions contain asphalt cutback, one or more clay minerals, and one or more of the surfactant compositions herein described.

The composition of the asphalt cutback can vary over a wide range. The asphalt cutback compositions vary in the source of the asphalt and in the type of solvent used in the formulation. Typically slow cure asphalts contain up to about 50% gas oil, medium cure asphalts contain about 15-45% kerosene, and fast cure asphalts contain about 15-45% naphtha. Examples of suitable asphalt cutbacks for use in this invention are Tropical cutback from Tropical Asphalt Products Corporation in Hallandale, Fla.; Seaboard asphalt cutback from Seaboard Asphalt Products Company, Baltimore, Md.; Brewer asphalt from the Brewer Company, Milford, Ohio; Monsey asphalt cutback from Monsey Products Corporation, Kimberton, Pa.; an asphalt cutback from Gardner Asphalt Company, Tampa, Fla.; and the Trumbull cutbacks from Trumbull Asphalt, Summit, Ill.

A variety of clay minerals can be used in this invention. Preferred clays are of the attapulgite type principally mined by the Engelhard Corporation and the Floridin Company. These clays are specifically sized after the mining process to provide the best properties when used in systems where improved thixotropy and/or gellation is desired. Other clays such as the bentonite type may also be used with good results.

Examples of suitable clays include Attagel 36 (as well as others in the Attagel series) an attapulgite clay available from Engelhard Corporation, Edison, N.J.; and Min-U-Gel AR, an attapulgite clay available from Floridin Company, Berkeley Springs W. Va.

The ratios of the components depend upon the desired physical properties of the final product. The weight ratio of asphalt cutback to clay is typically between about 20 to 1 and 5 to 1, and preferred ratios are between about 8 to 1 and 12 to 1. The weight ratio of clay to surfactant (the C/S ratio) is typically between about 5 to 1 and about 15 to 1, and preferably between about 8 to 1 and 12 to 1.

Such compositions may also contain fillers to achieve particular physical characteristics. The type and amount of fillers will affect the texture and viscosity of the asphalt coating composition and the use of fillers will be dictated by the properties needed in the intended application of the asphalt composition. Examples of suitable fillers include cellulosic fibers, sand, limestone, ground slate and diatomaceous earth.

Other adjuvants such as corrosion inhibitors, adhesion promotors, and the like, commonly added to asphalt coating compositions may be added to the compositions of this invention.

Another aspect of this invention is to the method of increasing the viscosity and/or gel strength of asphalt coating compositions by the addition of clay minerals and the surfactants described herein.

The order of addition of the components and the physical conditions of mixing can be varied over wide ranges. The mixing techniques necessary to optimize the desired properties in a coating formulation will be specific to the coating composition and the properties desired.

An effective procedure for use when high shear mixing is used is to add the cutback to the tank first, then while mixing with a Hobart® similar mixer, add the surfactant followed by the clay. The fillers are added last and mixed after the gel has formed. Further refinement of the mix can be achieved by solvent addition, preferably the solvent that is in the asphalt cutback or isopropanol.

When using low shear mixing, such as that provided by a Cowls mixer, a pre-gelling technique is effective to improve the dispersion of the clay and surfactant and enhance the viscosity properties of the final product. The pregelling process consists of thoroughly mixing all of the surfactant with between about 40 and about 80 percent, and preferably between about 50 and about 60 percent, of the cutback before adding all of the clay followed by more mixing until a thick gel is formed. Then the remainder of the cutback and all of the fillers are added and thoroughly mixed. Solvent additions can be made at this point as well, again preferably the solvent in the cutback or isopropanol.

The following examples are provided to illustrate the preferred compositions, the preferred method of preparation, and comparative evaluations. In these examples all percentages are by weight based on the total weight of all components in the described compositions.

EXAMPLE 1

Preparation of N-tallow-1,3 propylene diammonium neo octanoate: 165 g (1 equivalent of amine) of N-tallow-1,3 propylenediamine (Adogen 570S from Witco Chemical Corp.) was mixed with 144 g of neo octanoic acid (1 mole) (Exxon Chemicals). 36 g of water was added slowly with adequate stirring to keep the mixture uniform. The resulting mixture has a viscosity of 400 cps at 25 C., and a pour point below −5 C.

EXAMPLE 2

Preparation of asphalt compositions using a pregelling procedure.

50 g of asphalt cutback (from Tropical Asphalt) was thoroughly mixed with 1.2 g of the surfactant composition of Example 1 for about 1 minute with a spatula. 12 g of attapulgite clay (Attagel 36 from Engelhard) was added with thorough mixing for 1 minute. This mixture was allowed to stand for 15 minutes, and 37 g more asphalt cutback was added gradually with stirring and stirred for 2 minutes after the addition was complete.

To measure the viscosity or gel strength of the asphalt composition a 3 oz plastic cup 3 in. in diameter and 1 in. in depth was filled nearly to the top with the asphalt composition immediately after its preparation. A Precision Cone Penetrometer with a 10 g, ⅝ in. diameter cone was used and the penetration was measured by positioning the cone tip exactly at the surface of the asphalt, releasing the cone for exactly 5 seconds, and determining the depth of the penetration. Measurements were done in triplicate, and the values reported are averages for the penetration in millimeters multiplied by 10. Lower numbers indicate greater gel strength.

Using the surfactant preparation procedure of Example 1, surfactants were prepared from the polyamines, carboxylic acids, and polar activators described in the following examples. The organic salt surfactants were prepared at a ratio of 1 equivalent of N from the amine to 1 equivalent of carboxyl from the acid.

|  | Polyamine | Carboxylic acid | Polar activator |
| --- | --- | --- | --- |
| Example |  |  |  |
| 3 | N-tallowpropylene diamine | $C_9$–$C_{13}$ neo carboxylic acids, $C_{9.5}$ average | None |
| 4 | N-tallowpropylene diamine | $C_9$–$C_{13}$ neo carboxylic acids, $C_{9.5}$ average | 15% Water |
| 5 | N-tallowpropylene diamine | $C_9$–$C_{13}$ neo carboxylic acids, $C_{9.5}$ average | 20% Isopropanol |
| 6 | N-cocopropylenediamine | $C_9$–$C_{13}$ neo carboxylic acids, $C_9$–.5 average | 20% Isopropanol |
| 7 | N-tallowdipropylene triamine | $C_9$–$C_{13}$ neo carboxylic acids, $C_{9.5}$ average | 5% Isopropanol 9% Water |
| 8 | N-tallowtripropylene tetraamine | $C_9$–$C_{13}$ neo carboxylic acids, $C_{9.5}$ average | 8% Isopropanol 10% Water |
| 9 | N-Isodecyloxypropyl propylenediamine | $C_9$–$C_{13}$ neo carboxylic acids, $C_{9.5}$ average | None |
| 10 | N-Isodecyloxypropyl propylenediamine | $C_9$–$C_{13}$ neo carboxylic acids, $C_{9.5}$ average | 15% Water |
| 11 | N-tallowpropylene diamine | Neo heptanoic acid | 20% Isopropanol |
| 12 | N-tallowpropylene diamine | n-heptanoic acid | 20% Isopropanol |
| 13 | N-tallowpropylene diamine | $C_9$–$C_{28}$ neo carboxylic acids, $C_{11}$ average | 15% water |
| 14 | N-tallowpropylene diamine | $C_9$–$C_{28}$ neo carboxylic acids, $C_{11}$ average | 12% Water 18% Isopropanol |
| 15 | N-dodecyloxypropyl propylene diamine | Tall oil fatty acid | None |
| 16 | N-dodecyloxypropyl propylene diamine | $C_9$–$C_{28}$ neo carboxylic acids, $C_{14}$ average | None |
| 17 | N-dodecyl-2-methyl-2,5-pentamethylene diamine | $C_9$–$C_{13}$ neo carboxylic acids, $C_{9.5}$ average | None |
| Comparative Examples |  |  |  |
| 18 | N-tallowpropylene diamine | Acetic acid | 35% Isopropanol |
| 19 | N-tallowpropylene diamine | Propionic acid | 20% Isopropanol |
| 20 | N-tallowpropylene diamine | Neo pentanoic acid | 21% Isopropanol |
| 21 | Isodecyloxypropyl amine | Acetic acid | None |

Asphalt compositions were prepared from the surfactants synthesized in Examples 1 and 3 to 21, and the asphalt compositions and clays described below, by the procedure of EXAMPLE 2, and the gel strength was determined where noted using the cone penetrometer and the procedure described above.

|  |  |  |  | Penetration | |
| --- | --- | --- | --- | --- | --- |
| Surfactant | Asphalt | Clay | C/S ratio | 2 hr | 24 hr |
| Example 1 | Tropical | Attogel 36 | 10/1 | 87 | 63 |
| Example 3 | Tropical | Attogel 36 | 10/1 | >250 | >250 |
| Example 4 | Tropical | Attogel 36 | 10/1 | 133 | 94 |
| Example 5 | Tropical | Attogel 36 | 10/1 | 93 | 80 |
| Example 6 | Tropical | Attogel 36 | 10/1 | 96 | 89 |
| Example 7 | Tropical | Attogel 36 | 10/1 | 178 | 106 |
| Example 8 | Tropical | Attogel 36 | 10/1 | 180 | 111 |
| Example 9 | Tropical | Attogel 36 | 10/1 | 106 | 76 |
| Example 10 | Tropical | Attogel 36 | 10/1 | 104 | 94 |
| Example 11 | Tropical | Attogel 36 | 10/1 | 88 | 66 |
| Example 12 | Tropical | Attogel 36 | 10/1 | 105 | 84 |
| Example 13 | Tropical | Attogel 36 | 10/1 |  | 104 |
| Example 13 | Monsey | Attogel 36 | 10/1 | 126 | 105 |
| Example 14 | Trumbull | Min-U-Gel | 9/1 | 149 | 116 |
| Example 15 | Tropical | Attagel 36 | 10/1 |  |  |
| Example 16 | Tropical | Attagel 36 | 13.5/1 |  |  |
| Example 17 | Tropical | Attagel 36 | 10/1 | 175 |  |
| Comparative examples |  |  |  |  |  |
| Example 18 | Tropical | Attogel 36 | 10/1 | >250 | >250 |
| Example 19 | Tropical | Attogel 36 | 10/1 | >250 | >250 |
| Example 20 | Tropical | Attogel 36 | 10/1 | >250 | >250 |
| Example 21 | Tropical | Attogel 36 | 10/1 | >250 | >250 |
| Example 21 | Monsey | Attogel 36 | 10/1 | 203 | 173 |

The improved viscosity from the addition of the preferred polar activator is indicated by comparing Example 4, which contains 15% water and is effective, with Example 3 which contains no polar activator and is less effective.

Comparative Examples 18, 19, and 20 which were prepared from low molecular weight carboxylic acids, were solid materials before the addition of the isopropanol; they were ineffective compared to the compositions prepared with $C_7$ carboxylic acids in Examples 11 and 12.

EXAMPLE 23

A composition was prepared by mixing the following components:

| Tropical Asphalt Products asphalt cutback | 86.8 g |
| --- | --- |
| Engelhard Attagel 36 | 12 g |
| Surfactant of Example 13 | 1.2 g |
| Sulivan Chemical Interfibe 231 | 3 g |
| James River 200 mesh limestone | 20 g |

This composition, which has a 10:1 C/S ratio exhibits excellent viscosity and gel strength and provides a fibrated roof cement.

EXAMPLE 24

A composition was prepared by mixing the following components:

| Trumbull 6036 asphalt cutback | 91.0 g |
| --- | --- |
| Attagel 36 | 8.0 g |
| Surfactant of Example 13 | 1.0 g |
| Interfibe 230 | 3.0 g |
| Diatomaceous earth | 18.0 g |

This composition represents a fibrated plastic roof cement for southern climates with excellent gel strength with a 8:1 C/S ratio with only 8 percent clay.

The invention can be embodied in other forms without departing from the spirit or essential attributes thereof. Particularly it will be appreciated by those skilled in the art that the compositions will be useful in many applications where a gelled consistancy is desired in an essentially nonaqueous environment. Reference should therefore be had to the following claims, rather than to the foregoing specification to determine the scope of the invention.

The embodiments of the invention in which an exclusive property or privilege is claimed are defined as follows:

1. An asphalt composition comprising a mixture of at least one asphalt cutback, at least one clay mineral and a surfactant which is an organic salt of at least one polyamine with the structure:

$$\begin{array}{cc} H & H \\ R-N-(A-N)_n-H \end{array}$$

wherein R is chosen from the group consisting of (i) alkyl or alkenyl containing from about 10 to about 22 carbon atoms, and (ii) R'—O—CH2CH2CH2— wherein R' is alkyl containing from about 8 to about 22 carbon atoms;

A is a divalent hydrocarbyl group containing about 2 to about 6 carbon atoms;

and n is an integer from about 1 to about 3;

and at least one carboxylic acid with the structure:

$$R''-COOH$$

wherein R" is alkyl or alkenyl containing about 6 to about 28 carbon atoms.

2. The method of preparing an asphalt composition which comprises mixing at least one asphalt cutback, at least one clay mineral and a surfactant which is an organic salt of at least one polyamine with the structure:

$$\begin{array}{cc} H & H \\ R-N-(A-N)_n-H \end{array}$$

wherein R is chosen from the group consisting of (i) alkyl or alkenyl containing from about 10 to about 22 carbon atoms and, (ii) R'—O—CH2CH2CH2— wherein R' is alkyl containing from about 8 to about 22 carbon atoms;

A is a divalent hydrocarbyl group containing about 2 to about 6 carbon atoms;

and n is an integer from about 1 to about 3;

and at least one carboxylic acid with the structure:

$$R''-COOH$$

wherein R" is alkyl or alkenyl containing about 6 to about 28 carbon atoms.

* * * * *